(12) United States Patent
Wang

(10) Patent No.: US 7,239,431 B2
(45) Date of Patent: Jul. 3, 2007

(54) SYSTEM AND METHOD FOR RECOVERING PRIMARY CHANNEL OPERATION IN A FACSIMILE RECEIVER AND FACSIMILE MACHINE INCORPORATING THE SAME

(75) Inventor: Mingjie Wang, Eatontown, NJ (US)

(73) Assignee: Agere Systems Inc., Allentown, PA (US)

( * ) Notice: Subject to any disclaimer, the term of this patent is extended or adjusted under 35 U.S.C. 154(b) by 1129 days.

(21) Appl. No.: 09/826,074

(22) Filed: Apr. 4, 2001

(65) Prior Publication Data

US 2002/0145763 A1 Oct. 10, 2002

(51) Int. Cl.
H04N 1/00 (2006.01)
H04N 1/40 (2006.01)
H04B 1/00 (2006.01)
H04L 27/00 (2006.01)

(52) U.S. Cl. .................. 358/405; 358/400; 358/443; 358/447; 375/147; 375/229; 375/231; 375/316; 375/322; 375/326; 370/215; 370/516; 329/345

(58) Field of Classification Search ............... 358/400, 358/405, 406, 411, 412, 435, 438, 443, 447; 358/500, 409; 375/147, 229, 231, 232, 316, 375/322, 326, 222, 344, 354, 136, 340, 332, 375/227, 329, 362, 250, 282, 325, 226, 317–321, 375/323–324, 261, 327, 328, 279, 330, 331, 375/280, 333–337; 370/215, 516, 483, 252, 370/314, 276; 382/232; 329/308, 345; 348/735

See application file for complete search history.

(56) References Cited

U.S. PATENT DOCUMENTS 3,993,862 A * 11/1976 Karr ...................... 358/426.01
4,174,489 A * 11/1979 Guidoux et al. ............ 375/332
4,381,546 A * 4/1983 Armstrong .................. 375/227
4,538,111 A * 8/1985 Giusto ......................... 329/308
4,599,732 A * 7/1986 LeFever ...................... 375/346
4,601,044 A * 7/1986 Kromer et al. ............. 375/286
5,084,902 A * 1/1992 Aotani et al. ............... 375/350
5,175,746 A * 12/1992 Inoue et al. ................ 375/231
5,251,020 A * 10/1993 Sugiyama ................... 358/500
5,369,500 A * 11/1994 Jacobs ........................ 358/406
5,412,695 A * 5/1995 Murata ....................... 375/344
5,473,637 A * 12/1995 Gardner ..................... 375/329
5,524,026 A * 6/1996 Murata ....................... 375/329
5,557,644 A * 9/1996 Kuwabara ................... 375/340
5,684,835 A * 11/1997 Kroeger et al. ............. 375/325
5,727,083 A * 3/1998 Kelly et al. ................. 382/232
5,790,594 A * 8/1998 Peng .......................... 375/222
5,793,250 A * 8/1998 Fukushi ...................... 329/307
5,870,438 A * 2/1999 Olafsson .................... 375/344
5,949,828 A * 9/1999 Izumi ......................... 375/326
5,956,374 A * 9/1999 Iwamatsu ................... 375/320
6,075,814 A * 6/2000 Yamano et al. ............. 375/222
6,307,881 B1 * 10/2001 Noma et al. ................ 375/222

(Continued)

Primary Examiner—Aung S. Moe
Assistant Examiner—Beniyam Menberu

(57) ABSTRACT

A system for, and method of recovering primary channel operation in a facsimile (fax) receiver and a fax machine that incorporates the system, the method or both. In one embodiment, the system includes: (1) a signal receiver that receives a signal containing first and second points located at first and second angles and (2) angle determination circuitry that determines an offset angle by which the signal has been rotated based on the first and second angles.

26 Claims, 4 Drawing Sheets

U.S. PATENT DOCUMENTS

| | | | |
|---|---|---|---|
| 6,426,946 B1 * | 7/2002 | Takagi et al. | 370/252 |
| 6,438,186 B1 * | 8/2002 | Strait | 375/354 |
| 6,490,010 B1 * | 12/2002 | Shibuya et al. | 348/735 |
| 6,597,725 B1 * | 7/2003 | Ishii | 375/136 |
| 6,687,292 B1 * | 2/2004 | Garcia | 375/235 |
| 6,728,308 B1 * | 4/2004 | Chu et al. | 375/222 |
| 6,731,710 B1 * | 5/2004 | Genossar et al. | 375/362 |
| 6,954,493 B2 * | 10/2005 | Noma | 375/222 |
| 7,031,382 B2 * | 4/2006 | Hessel et al. | 375/229 |
| 2006/0008036 A1 * | 1/2006 | Moriai | 375/343 |

* cited by examiner

SYSTEM AND METHOD FOR RECOVERING PRIMARY CHANNEL OPERATION IN A FACSIMILE RECEIVER AND FACSIMILE MACHINE INCORPORATING THE SAME

TECHNICAL FIELD OF THE INVENTION

The present invention is directed, in general, to facsimile (fax) machines and, more specifically, to a system and method for recovering primary channel operation in a fax machine that incorporates the system, the method or both.

BACKGROUND OF THE INVENTION

With the development of telecommunication systems, the use of facsimile (synonymously referred to as "fax") transmissions to carry data is becoming increasingly widespread. Fax machines, employing a wide array of technologies and various coding schemes and protocols, are now an increasingly integral and ubiquitous part of the modern business and personal world. There is every reason to believe that this trend will continue.

The latest facsimile protocol, International Telecommunications Union Recommendation (ITU) V.34 half-duplex, uses phase and amplitude modulated "symbols" to transmit and receive the data of a facsimile image. When the received symbols are clean and distinguishable, they can be correctly identified and the fax image data they carry decoded.

ITU V.34 protocols calls for time division multiplexing between primary (user data) channel and control channel transmission. The primary channel employs high speed ITU V.34 modulation to transmit data of fax images, while the control channel uses a lower speed, full duplex, ITU V.21 modulation. The control channel is employed to communicate control information, such as symbol speed and density, that will subsequently be used in the primary channel (V.34) communication.

Fax machines often use an equalizer to adjust incoming symbols such that they can be properly identified and decoded. Since the primary channel transmission is not present during the control channel transmission period, the equalizer of the receiving fax must be retrained before every transfer back from the control channel to the primary channel. If the equalizer is not trained before the fax receiver enters into the primary channel, the received symbols will not be correctly identified, and erroneous fax data will result. Typically, the equalizer must be retrained with every page of faxed data sent.

Certain techniques have been developed to help decrease the necessary equalizer retraining time. For instance, it is advantageous for a fax machine to sample the incoming symbols of the primary channel transmission at the same time of a symbol period as when the equalizer was trained during a "phase three" initialization period of the fax machine start up. If the equalizer of the receiving fax machine uses its phase three symbol sampling coefficients (generated during the phase three initialization process) as a factor in retraining the equalizer before the fax receiver enters into the primary channel, the time necessary for equalizer retraining can be significantly reduced.

Nonetheless, the phase three coefficients should accurately reflect the actual time in a symbol sampling period that is used in the primary channel reception by the receiving fax machine. If, for some reason, the fax machine is not sampling the incoming symbols of the primary channel transmission at the same rate as the incoming symbols were sampled during the phase three initialization of the fax machine, the incoming symbols may be read by the equalizer as blurry and indistinct.

To combat this problem, a signal analysis technique known as "timing jamming" may be advantageously employed. Those skilled in the art are familiar with timing jamming. After employing the technique of timing jamming, the receiving fax machine may create "clean" symbols for use by its equalizers. The equalizer can then advantageously decode, with the aid of their phase three coefficients, the incoming symbol data.

However, after using the timing-jamming technique, the symbols may still be rotated by an arbitrary offset angle, and thus may be misinterpreted by the equalizer, leading to erroneous output. Further, since the output of the equalizer may be used to retrain or fine tune the equalizer at the next transfer from the control channel to the primary channel, these output errors can result poor equalizer performance. The retrained equalizer's erroneous coefficients may significantly differ from the coefficients obtained during the phase three initialization period of the receiving fax machine. The phase three coefficients may be of little use in helping the equalizer to interpret any incoming symbols, which could greatly increase the time necessary for equalizer retraining and reinitialization for symbol interpretation after primary channel transfer.

Therefore, what is needed in the art is a technique, involving little retraining, to determine the phase angle by which incoming symbols should be offset to allow them to be properly interpreted by the receiving fax machine equalizers.

SUMMARY OF THE INVENTION

To address the above-discussed deficiencies of the prior art, the present invention provides a system for, and method of recovering primary channel operation in a fax receiver and a fax machine that incorporates the system, the method or both. In one embodiment, the system includes: (1) a signal receiver that receives a signal containing first and second points located at first and second angles and (2) angle determination circuitry that determines an offset angle by which the signal has been rotated based on the first and second angles.

The present invention introduces, in one aspect, the concept of employing a signal in the primary channel to determine an offset angle and thereby recover the proper carrier phase angle to allow symbols in the primary channel to be properly interpreted without requiring a lengthy retraining period. The system and method can be employed in a fax machine, but can also be employed in any device that employs phase modulated symbols to transmit information.

In one embodiment of the present invention, about 90° separate the first and second angles. Of course, other angles of separation are within the broad scope of the present invention.

In one embodiment of the present invention, the signal conforms to ITU V.34. Those skilled in the pertinent art understand that ITU V.34 calls for certain signals to be transmitted when a primary channel commences. These signals can contain the first and second points that allow an offset angle to be determined according to the principles of the present invention. Of course, the present invention may be employed in the context of other recommendations or standards calling for suitable signals.

In one embodiment of the present invention, the angle determination circuitry causes the offset angle to equal the first angle when at least 180° separate the first and second angles. Of course, any appropriate angle may be employed as a threshold. In a related embodiment, the angle determination circuitry causes the offset angle to equal the second angle when fewer than 180° separate the first and second angles. Again, any appropriate angle may be employed as a threshold.

In one embodiment of the present invention, the signal is an S signal. Those skilled in the pertinent art understand that the S signal begins a primary channel under V.34. Of course, other suitable signals in the primary channel could be employed to determine the desired offset angle.

In one embodiment of the present invention, the angle determination circuitry refines the offset angle based on a subsequent signal. In an embodiment to be illustrated and described, the subsequent signal is a PP signal, received immediately after the S signal. The angle determination circuitry can employ essentially the same logic to redetermine the offset angle based on the subsequent signal and elect to adjust the original offset signal based thereon.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
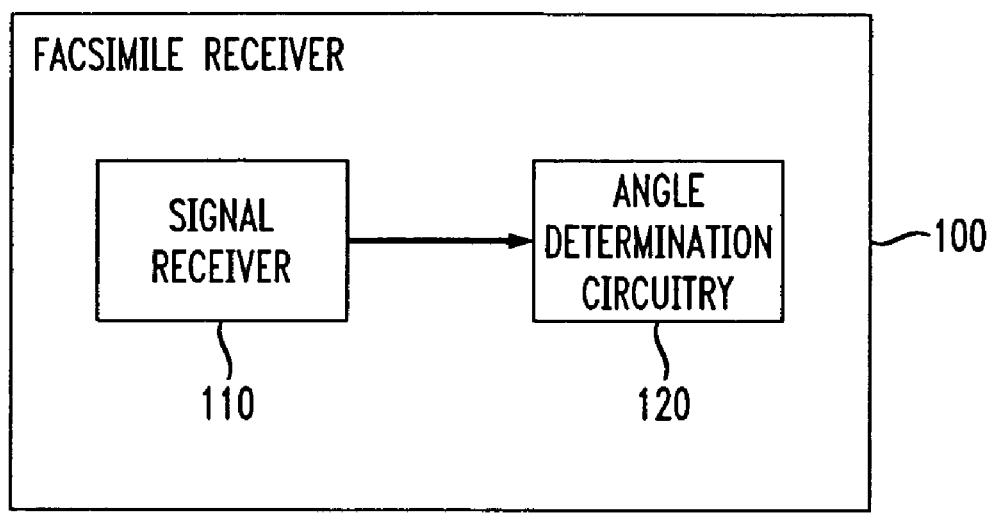
FIG. 1 illustrates a diagram of an embodiment of a system for recovering primary channel operation in a facsimile receiver constructed according to the principles of the present invention.

Referring initially to FIG. 1, illustrated is a diagram of an embodiment of a system for recovering primary channel operation in a facsimile receiver 100 constructed according to the principles of the present invention. The facsimile receiver 100 has a signal receiver 110 coupled to angle determination circuitry 120.

The signal receiver 110 may use a fax protocol, such as ITU V.34 half-duplex, to transmit and receive faxes at speeds up to, for instance, 33.6 kb/s. As per ITU V.34, a receiving fax modem equalizer of angle determination circuitry 120 is "trained" during a so-called "phase three" period of the fax start-up. This training should allow the equalizer to interpret received symbols. A set of three known signals, namely, S/Sbar, PP, and TRN may be sent during this period.

The trained equalizer of the angle determination circuitry 120 is used in a primary channel transmission to receive fax data from the transmitting fax machine employing the interception of transmitted symbols through the signal receiver 110. Time multiplexed between transmissions of a primary channel data is a further transmission of control information. This control information is typically transmitted at a lower speed. For instance, full duplex ITU V.21 modulation is typically used to exchange control information and parameters used in the primary channel communication, while high speed ITU V.34 modulation is used to exchange fax data. Since the primary channel transmission (i.e. fax data) is not present during the control channel transmission period, the equalizer of the angle determination circuitry 120 is typically retrained at the beginning of each primary channel data transfer.

It may be advantageous for a given equalizer to sample the incoming symbols at the same time ("phase") of a symbol period as when the equalizer was trained to do so during the phase three initialization period of the fax machine start up. Otherwise the incoming symbols may be read by the equalizer as blurry and indistinct. However, even if the receiving fax is not sampling the incoming symbols at the same time period as during the initial phase three startup of the receiving fax machine, signal analysis techniques, such as timing jamming, can alleviate some problems associated with this situation.

Timing jamming may allow the equalizer of the receiving fax to use the phase three coefficients for retraining even if the signal receiver 110 is not sampling the incoming symbols at the same time period as it was during the initial phase three startup. With the proper use timing jamming by the signal receiver 110, the received symbols as interpreted by the equalizer of the angle determination circuitry 120 may be distinguishable.

However, when using such signal analysis techniques such as timing jamming, the symbols as received by the equalizer may be rotated by an arbitrary phase angle, which may in turn lead to a misinterpretation of these received symbols by the equalizer. The errors between the ideal transmitted symbols and the equalizer outputs can be large due to this arbitrary angle. These erroneous outputs of the equalizer, if used to help in turn retrain the equalizer, may result in yet another group of equalizer training coefficients still further from the ones obtained during phase three initialization training.

The disadvantageous rotation of signals by an arbitrary phase angles when the signal receiver 110 uses various signal analysis techniques, such as timing jamming, may be substantially compensated for by the angle determination circuitry 120. The angle determination circuitry 120 of the present invention advantageously calculates an angle between certain known ideal points and actual received points from the output of the receiver 110. The angle determination circuitry 120 can include either hardware, software, or the combination of both hardware and software configured for calculating the angle between the ideal and actual points. For instance, the angle determination circuitry 120 can be a digital signal processor executing instructions for calculating the angle between the ideal and actual points.

Figure 2A:
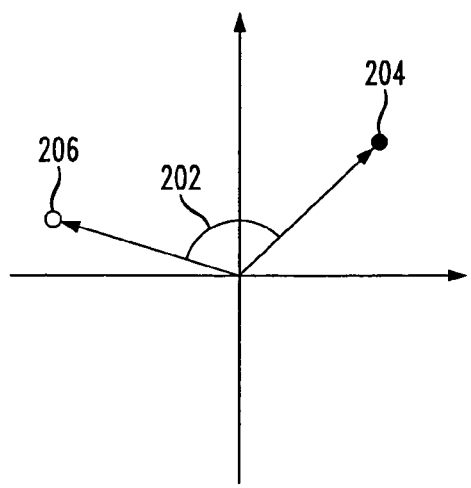
FIG. 2A illustrates a diagram of an exemplary equalizer output signal that is rotated by an unknown offset angle.

Turning now to FIG. 2A, illustrated is a diagram of an exemplary equalizer output signal that is offset by an arbitrary angle 202 due to timing jamming. The ideal output of the equalizer would normally have been in a position (represented by the black dot 204) if the timing coefficients used by the equalizer in signal receiver 110 from the ITU V.34 phase three startup were precisely accurate. However, because the phase three coefficients are not precisely accurate, timing jamming is used. After timing jamming, the symbol is rotated by the offset angle 202 from the position of the black dot 204, to the position of the white dot 206, by the signal receiver 110, and may be interpreted as such by the equalizer. The black dot 204 and white dot 206 should typically be of equal amplitude.

Figure 2B:
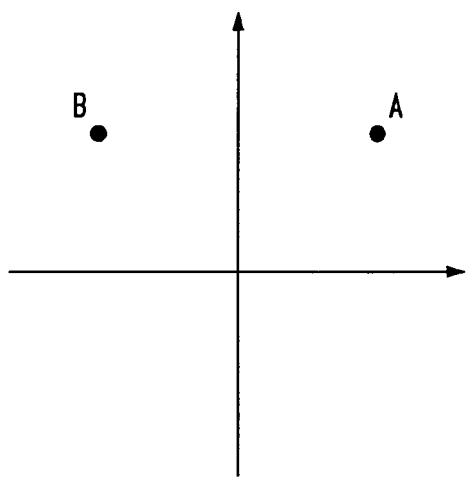
FIG. 2B illustrates a diagram of an exemplary signal that can be employed to determine an offset angle.

Turning now to FIG. 2B, illustrated is a diagram of an exemplary signal that can be employed to determine an offset angle. Since under ITU V.34 half-duplex protocol, the primary channel signal starts with a signal "S", the S signal can be used to calculate the offset angle between the actual constellation points and the ideal constellation points, as will be detailed below. Of course, other suitable signals in the primary channel could be employed to determine the desired offset angle.

One embodiment of the present invention is based upon the fact that the signal S actually consists of two points. As defined in ITU V.34, the signal S is transmitted by alternating between point A of FIG. 2B and the same point rotated by 90°, as shown as point B of FIG. 2B. Of course, other angles of separation are within the broad scope of the present invention.

Figure 2C:
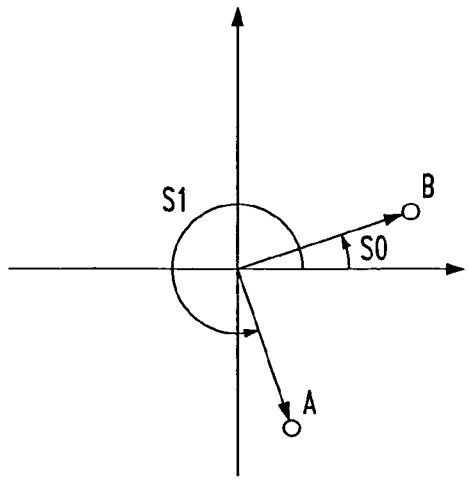
FIG. 2C illustrates a diagram of the signal of FIG. 2A that has been rotated by an unknown offset angle to the known angles of S0 and S1, as measured from the positive X axis.

Turning now to FIG. 2C, illustrated is a diagram of the signal of FIG. 2B that has been rotated by an unknown offset angle to the angles of S0 and S1, as measured from the positive X axis. There is still a 90° differential between the two symbol points A and B of the signal S, but the two symbol points have been rotated by an unknown angle after the signal analysis technique of timing jamming has been applied. However, the facsimile receiver 100 could also equally validly assign angle S0 to point A and angle S1 to point B.

Figure 3:
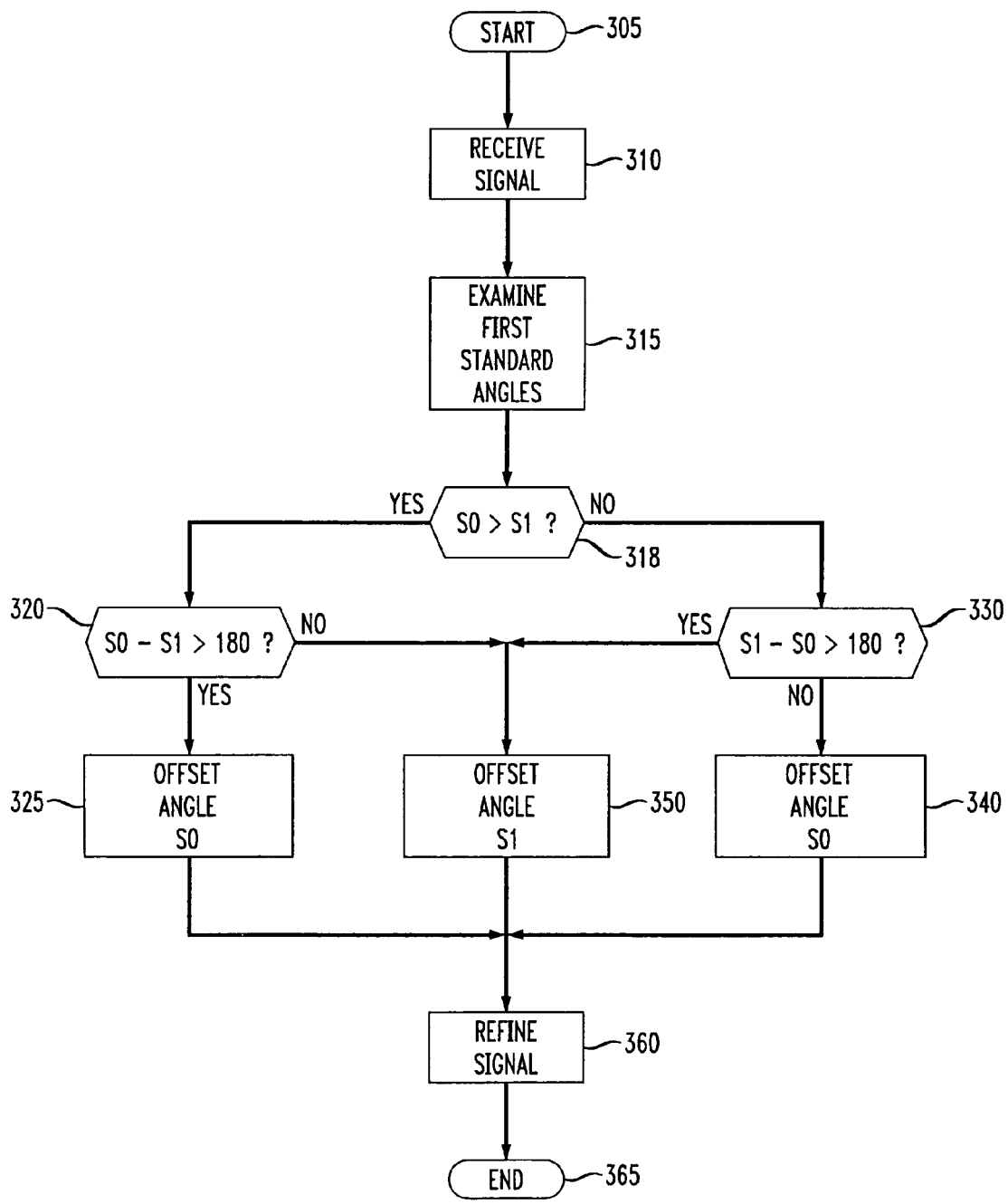
FIG. 3 illustrates a diagram of an embodiment of a method of recovering primary channel operation in a fax receiver carried out according to the principles of the present invention.
Figure 4:
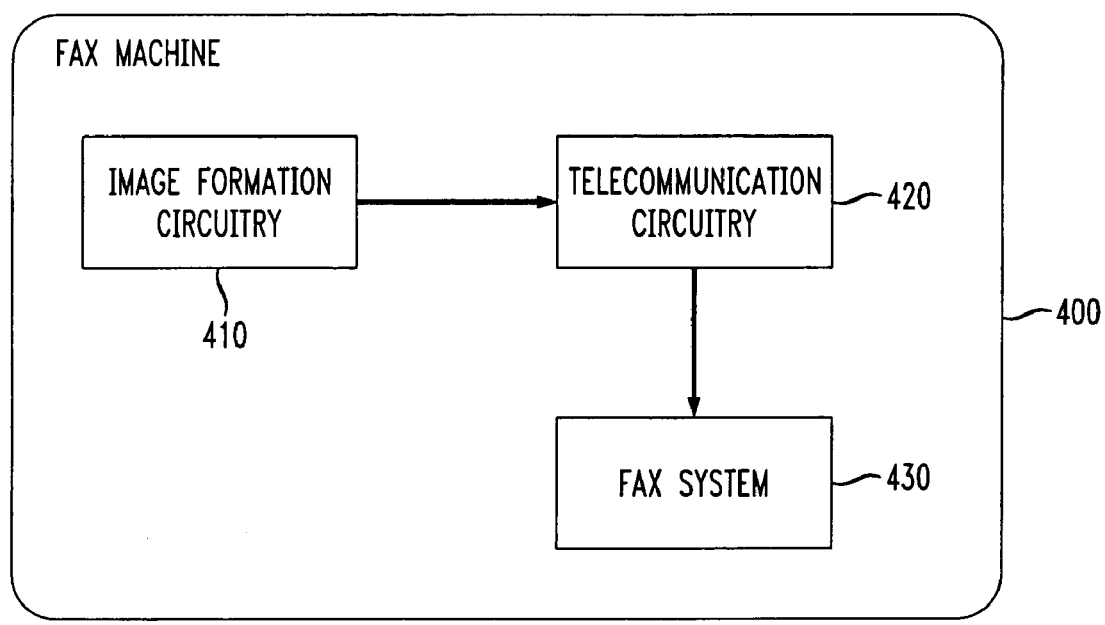
FIG. 4 illustrates a diagram of an embodiment of a fax machine that can incorporate the system of FIG. 1, the method of FIG. 3 or both.

Turning now to FIG. 3, illustrated is a diagram of an embodiment of a method of recovering the primary channel operation through the retraining of the equalizer of the fax receiver carried out according to the principles of the present invention. The angle determination circuitry 120 is initiated at a step 305 for received symbol analysis. After the equalizer has been initiated, the signal receiver 110 receives an incoming data channel signal in a step 310.

After the fax modem receives the incoming data channel signal in the step 310, the angle determination circuitry 120 then examines the first and second angles of the S signal of the primary channel in step 315. This examination may proceed as follows: S0 is the angle (measuring counterclockwise) from the x positive axis to a first point, and S1 is the angle (measuring counterclockwise) from the x positive axis to a second point (although assigning the opposite correlation of the first and second angles S0 to the second point and S1 to the first point is also possible). These axes of reference illustrate a convention wherein the received signal point A should be ideally situated on the positive x axis and the received signal point B should ultimately be on the positive y axis. However, any other reference point for measuring the unknown offset angle of the received signal points A and B may be used, so long as it is used in a consistent manner.

The angle determination circuitry 120 then compares the angles of S0 and S1 in a step 318. If the angle of S0 is greater then S1, the angle determination circuitry 120 will then execute the step 320, to be detailed below. If the angle of S0 is instead not greater than S1, the angle determination circuitry 120 will then execute a step 330, to be detailed below.

If the angle determination circuitry 120 has determined that the angle S0 is greater than the angle S1, the angle determination circuitry 120 then determine whether or not the value of the angle of S0 minus the value of the angle of S1 is greater than 180°, in the step 320. If the angle of S0 minus the value of the angle of S1 is greater than 180°, the angle determination circuitry 120 then executes a step 325, to be detailed below. If the angle of S0 minus the value of the angle of S1 is not greater than 180°, then the angle determination circuitry 120 instead executes a step 350, also to be detailed below. Of course, any appropriate angle may be employed as a threshold.

If the angle determination circuitry 120 has determined that the angle of S0 is instead not greater than S1, the angle determination circuitry 120 then determines if the value of the angle of S1 minus the value of the angle of S0 is greater than 180°, in the step 330. If the value of the angle of S1 minus the value of the angle of S0 is greater than 180°, then the angle determination circuitry 120 executes the step 350, to be detailed below. If the value of the angle of S1 minus the value of the angle of S0 is not greater than 180°, the angle determination circuitry 120 then executes a step 340, also to be detailed below.

If the angle of S0 minus the value of the angle of S1 is greater than 180', the angle determination circuitry 120 then determines that the point rotated by angle S0 is the point "A" as disclosed by FIG. 2B, and that the point rotated by angle S1 is the point "B" as disclosed by FIG. 2B, in the step 325. The angle determination circuitry 120 will therefore compensate the carrier phase by S0 degrees so to have point "A" come into alignment with the positive x axis and point "B" come into alignment with the positive y axis.

If the angle of S1 minus the value of the angle of S0 is not greater than 180°, the angle determination circuitry 120 then determines that the first point is the point "A", rotated by an angle of S0 degrees, as disclosed by FIG. 2B, and that the second point is the point "B" rotated by S1 degrees, as disclosed by FIG. 2B, in the step 350. The angle determination circuitry 120 will therefore compensate the carrier phase by S0 degrees.

If the angle S0 minus the angle S1 is not greater than 180° when the angle S0 is greater than the angle S1, or if the angle S1 minus the angle S0 is greater than 180° when the angle S1 is greater than S0, the angle determination circuitry 120 then determines that the second point is instead the point "A" rotated by S1 degrees as disclosed by FIG. 2B, and that the first point is the point "B" rotated by S0 degrees as disclosed by FIG. 2B, in the step 350. The angle determination circuitry 120 will therefore compensate the carrier phase by S1 degrees. Without the carrier phase adjustment of the angle determination circuitry 120, the training of the equalizer may take a much longer time.

After executing either the step 325, 340 or 350, the equalizer should be ready to more accurately decode the received symbols, which are now angle compensated for the effects of the timing jamming angle rotation. Additionally, a PP signal, as defined in ITU V.34 protocol, may then be used, if desired, to fine tune the equalizer coefficients in a step 360. Since the timing jammed, angle compensated PP signal output coefficients of the equalizer should already be close to the phase three coefficients used by the equalizer in interpreting incoming symbols, it takes but little time to more precisely train the equalizer with the PP signal to receive the full constellation of symbols used in the primary channel transmissions. The signal PP may be used in an analogous manner as the signal S in FIG. 3 after the transfer from the control to the primary channel. In any event, the angle determination circuitry 120 then ends for the received symbol in a step 365, although the equalizer would still interpret the received symbol. coupled to a fax system 430 for recovering primary channel operation in the facsimile receiver. The image formation circuitry 410 receives data, and then transmits the data in the form of an image to the telecommunication circuitry 420. The telecommunication circuitry 420 receives an image from the image formation circuitry 410 and performs various functions upon this image. This transformed data from the telecommunication circuitry 420 is then transmitted to the remaining part of the fax machine 400, including the system 430 for recovering the primary channel operation. For more information concerning digital communication and digital communication theory, please see "Digital Communication," 2nd. Ed., by Edward A. Lee and David G. Messerschmitt, published by Kluwer Academic Publishing in August 1993, which is hereby incorporated by reference in its entirety.

Although the present invention has been described in detail, those skilled in the art should understand that they can make various changes, substitutions and alterations herein without departing from the spirit and scope of the invention in its broadest form.

What is claimed is:

1. A system for recovering primary channel operation in a facsimile receiver, comprising:
    a signal receiver that receives a signal containing first and second points located at first and second angles; and
    angle determination circuitry that determines one of said first and second angles is an offset angle by which said signal has been rotated and refines said offset angle based on a subsequent signal.

2. The system as recited in claim 1 wherein about 90° separate said first and second angles.

3. The system as recited in claim 1 wherein said signal conforms to International Telecommunications Union Recommendation V.34.

4. The system as recited in claim 1 wherein said angle determination circuitry causes said offset angle to equal said first angle when at least 180° separate said first and second angles.

5. The system as recited in claim 1 wherein said angle determination circuitry causes said offset angle to equal said second angle when fewer than 180° separate said first and second angles.

6. The system as recited in claim 1 wherein said signal is an S signal.

7. A method of recovering primary channel operation in a facsimile receiver, comprising:
    examining first and second angles of first and second points of a signal;
    determining one of said first and second angles is an offset angle by which said signal has been rotated; and
    refining said offset angle based on a subsequent signal.

8. The method as recited in claim 7 wherein about 90° separate said first and second angles.

9. The method as recited in claim 7 wherein said signal conforms to International Telecommunications Union Recommendation V.34.

10. The method as recited in claim 7 wherein said determining comprises causing said offset angle to equal said first angle when at least 180° separate said first and second angles.

11. The method as recited in claim 7 wherein said determining comprises causing said offset angle to equal said second angle when fewer than 180° separate said first and second angles.

12. The method as recited in claim 7 wherein said signal is an S signal.

13. A facsimile machine, comprising:
    image formation circuitry;
    telecommunications circuitry, including a facsimile receiver, coupled to said image formation circuitry; and
    a system, associated with said facsimile receiver, for recovering primary channel operation, including:
        a signal receiver that receives a signal containing first and second points located at first and second angles, and
        angle determination circuitry that determines one of said first and second angles is an offset angle by which said signal has been rotated and refines said offset angle based on a subsequent signal.

14. The facsimile machine as recited in claim 13 wherein about 90° separate said first and second angles.

15. The facsimile machine as recited in claim 13 wherein said signal conforms to International Telecommunications Union Recommendation V.34.

16. The facsimile machine as recited in claim 13 wherein said angle determination circuitry causes said offset angle to equal said first angle when at least 180° separate said first and second angles.

17. The facsimile machine as recited in claim 13 wherein said angle determination circuitry causes said offset angle to equal said second angle when fewer than 180° separate said first and second angles.

18. The facsimile machine as recited in claim 13 wherein said signal is an S signal.

19. An apparatus that determines the difference between a received constellation of signals and an expected constellation of signals, comprising:
    a signal receiver that receives a constellation of signals containing first and second points located at first and second angles, respectively; and
    angle determination circuitry that determines one of said first and second angles is an offset angle by which the first and second points have been rotated from an expected constellation of signals and refines said offset angle based on a subsequent signal.

20. The apparatus as recited in claim 19 wherein about 90° separate said first and second angles.

21. The apparatus as recited in claim 19 wherein said signal conforms to International Telecommunications Union Recommendation V34.

22. The apparatus as recited in claim 19 wherein said angle determination circuitry causes said offset angle to equal said first angle when at least 180° separate said first and second angles.

23. The apparatus as recited in claim 19 wherein said angle determination circuitry causes said offset angle to equal said second angle when fewer than 180° separate said first and second angles.

24. The apparatus as recited in claim 19 wherein said signal is an S signal.

25. The apparatus as recited in claim 19 wherein the angle determination circuitry updates an equalizer in the signal receiver as a function of the determined offset angle.

26. The apparatus as recited in claim 19 wherein the angle determination circuitry updates an equalizer applied to incoming data signals based upon the offset angle between the incoming data signals and a set of training signals.

* * * * *